US012759170B2

(12) United States Patent
Mcauley et al.

(10) Patent No.: US 12,759,170 B2
(45) Date of Patent: Oct. 13, 2026

(54) SYSTEMS AND METHODS FOR MAGNETIC GRIPPING

(71) Applicant: OnRobot A/S, Odense SØ (DK)

(72) Inventors: Jason Mcauley, Los Angeles, CA (US); John Andrew Fortus, Los Angeles, CA (US); Nicholas Wettels, Los Angeles, CA (US)

(73) Assignee: OnRobot A/S, Odense SØ (DK)

( * ) Notice: Subject to any disclaimer, the term of this patent is extended or adjusted under 35 U.S.C. 154(b) by 986 days.

(21) Appl. No.: 18/073,475

(22) Filed: Dec. 1, 2022

(65) Prior Publication Data

US 2023/0158689 A1 May 25, 2023

Related U.S. Application Data

(63) Continuation of application No. PCT/EP2021/064792, filed on Jun. 2, 2021.

(60) Provisional application No. 63/033,503, filed on Jun. 2, 2020.

(51) Int. Cl.
*B25J 15/06* (2006.01)
*B25J 13/08* (2006.01)

(52) U.S. Cl.
CPC ......... *B25J 15/0608* (2013.01); *B25J 13/086* (2013.01)

(58) Field of Classification Search
CPC .......... B23Q 3/15; B23Q 3/152; B23Q 3/154; B23Q 3/1543; B23Q 3/1546; B25B 11/002; B25J 13/086; B25J 15/06; B25J 15/0608; B65H 3/16; B65H 3/18; B66C 1/06; B66C 1/08; H01F 7/0226; H01F 7/0242; H01F 7/0247; H01F 7/0252; H01F 7/0257; H01F 7/0268; H01F 7/04; H01H 36/002
USPC ................................................ 294/65.5, 190
See application file for complete search history.

(56) References Cited

U.S. PATENT DOCUMENTS

| | | | | |
|---|---|---|---|---|
| 2,243,616 A * | 5/1941 | Bing | H01F 7/0257 | 310/152 |
| 3,034,025 A * | 5/1962 | Budreck | H01F 7/0226 | 335/295 |
| 4,956,625 A * | 9/1990 | Cardone | B23Q 3/1546 | 335/290 |
| 8,350,663 B1 * | 1/2013 | Michael | B23Q 3/1546 | 338/288 |
| 8,878,639 B2 * | 11/2014 | Kocijan | H01F 7/0257 | 335/287 |
| 11,830,671 B2 * | 11/2023 | Trevors | H01F 7/021 | |
| 12,323,024 B2 * | 6/2025 | Morton | B25B 11/002 | |
| 2006/0012094 A1 * | 1/2006 | Wang | B25B 11/002 | 269/8 |
| 2012/0205505 A1 * | 8/2012 | Piech | H01F 7/04 | 24/303 |
| 2014/0218146 A1 * | 8/2014 | Evans | H01F 7/04 | 335/306 |

(Continued)

FOREIGN PATENT DOCUMENTS

| | | | |
|---|---|---|---|
| CA | 3169387 A1 * | 12/2022 | H01F 7/0242 |
| EP | 494028 A1 * | 7/1992 | |

(Continued)

*Primary Examiner* — Joshua E Rodden
(74) *Attorney, Agent, or Firm* — Elevated IP, LLC

(57) ABSTRACT

Provided herein are systems and methods for magnetically gripping an object. A magnetic gripping system may include a gripper having different, tunable gripping states that are associated with different magnetic field strengths.

22 Claims, 9 Drawing Sheets

(56) References Cited

U.S. PATENT DOCUMENTS

| | | | | |
|---|---|---|---|---|
| 2015/0022299 | A1 | 1/2015 | Kocijan | |
| 2016/0289046 | A1* | 10/2016 | Norton | B66C 1/04 |
| 2018/0315563 | A1* | 11/2018 | Morton | H01F 7/0257 |
| 2021/0272732 | A1* | 9/2021 | Choi | H01F 7/206 |
| 2024/0355519 | A1* | 10/2024 | Trevors | H01F 7/04 |
| 2025/0316429 | A1* | 10/2025 | Morton | H01F 7/0226 |

FOREIGN PATENT DOCUMENTS

| | | | | | |
|---|---|---|---|---|---|
| EP | 2532615 | A1 | * | 12/2012 | H01F 7/04 |
| FR | 2891267 | A1 | * | 3/2007 | B66C 1/04 |
| JP | 2000044160 | A | * | 2/2000 | B66C 1/04 |
| KR | 98072201 | A | * | 10/1998 | |
| WO | WO-2018200948 | A1 | * | 11/2018 | B23Q 3/15 |
| WO | 2019165228 | A1 | | 8/2019 | |
| WO | WO-2019148292 | A1 | * | 8/2019 | H01F 7/0242 |
| WO | 2021245136 | A1 | | 12/2021 | |
| WO | WO-2022251593 | A2 | * | 12/2022 | H01F 7/04 |

* cited by examiner

100

117

100

SYSTEMS AND METHODS FOR MAGNETIC GRIPPING

CROSS-REFERENCE

This application is a continuation application of International Patent Application No. PCT/EP2021/064792, filed Jun. 2, 2021, which claims the benefit of U.S. Provisional Patent Application No. 63/033,503, filed Jun. 2, 2020, each of which is entirely incorporated by reference herein.

BACKGROUND

Holding, lifting, or moving objects with ferromagnetic properties are of importance in many fields including robotics, material handling, manufacturing, building construction, etc. In most cases, the common steps in performing a task on a workpiece that may have ferromagnetic properties can include approaching the workpiece, engaging the workpiece which commonly involves some form of holding, attaching, or gripping, and finally releasing of the workpiece.

Magnetic grippers use a variety of magnets such as electromagnets that require electric current to function or permanent magnets that do not necessarily need electricity to operate. Electricity may still be used to perform the remainder of the functions in a device that uses magnetic grippers such as moving a robotic arm. Choosing electro- or permanent magnets can affect many features of a device such as the capacity, switching mechanism, depth of magnetic field, and the like.

In particular, electromagnets have the capability to produce a varying magnetic field as the electric current producing the magnetic field can be manipulated. Permanent magnets, on the other hand, need not be connected to a source of electricity and can be lighter in weight as they do not need to carry wire coils and other pieces required in an electromagnet. Therefore, using permanent magnets can give a device more freedom of movement. Permanent magnets have a fixed magnetic field or magnetizing force per volume or length of magnet which is a feature of the material of the magnet being used. Therefore, in a magnetic gripper device, the number of magnets used can be changed to increase or decrease the overall magnetic force of the device and maintain grip upon a loss of power condition.

SUMMARY

If a magnetic gripper device intended to interact with a workpiece is preemptively activated at some distance, or some range of distances, of the workpiece, it can create a hazard in the working environment. For example, the device may pull other objects towards the device (e.g., sharp objects may become a missile hazard), cause a pinch hazard by for example pinching a person's fingers or other bodily parts, and/or damage the workpiece, the gripper, or both by for example accelerating the workpiece towards the gripper excessively. Provided herein are methods and systems that addresses the need to address at least the abovementioned problems. The present disclosure provides methods and systems for a magnetic gripper with tunable magnetic force to handle ferromagnetic materials of different thicknesses with precision. The invention may also include a range-based sensor to detect a workpiece to activate the magnetic field in a safe distance.

The systems and methods described herein can modulate the magnetic field to engage only one or a few workpieces from a plurality of workpieces. For example, in a stack of metal sheets, the magnetic field can be modulated to generate enough magnetic force to grip a first sheet from the stack of sheets but not too strong of a field to pick a second sheet. After picking the first sheet, the magnetic force can be increased (e.g., up to the maximum force) to increase gripping force, for example, for safety. The magnetic gripper can activate a magnetic field with varying intensity to lift thick and thin workpieces.

The systems and methods described herein can also provide a range-based sensor that can detect (i) an object being dropped or still attached to the gripper, (ii) the distance from an object to increase the speed of, decrease the speed of, or stop, the device as the device approaches the object, and (iii) the distance from the object before the magnetic device is activated.

In an aspect, the present disclosure provides a system for handling an object, comprising a first arrangement of magnets, a second arrangement of magnets, wherein the second arrangement of magnets and the first arrangement magnets are movable relative to one another, and a plurality of pole members, wherein the plurality of pole members are (i) in a first magnetic interaction with the first arrangement of magnets and (ii) in a second magnetic interaction with the second arrangement of magnets, wherein each pole member of the plurality of pole members is configured to transfer magnetic flux caused by the first magnetic interaction and the second magnetic interaction to the object, and wherein one or more of the first arrangement of magnets and the second arrangement of magnets are configured to vary in position relative to one another to vary the first magnetic interaction, the second magnetic interaction, or both, to vary the magnetic flux transferred to the object.

In some embodiments, in a first set of configurations of the first arrangement of magnets and the second arrangement of magnets, the magnetic flux is adapted to lift multiple objects, including the object, and in a second set of configurations of the first arrangement of magnets and the second arrangement of magnets, the magnetic flux is adapted to lift only a single object, wherein the single object is the object, and the system in a third set of configurations of the first arrangement of magnets and the second arrangement of magnets, the magnetic flux is adapted to release the object.

In some embodiments, the system further comprises a housing structure, wherein the housing structure further comprises a gripping surface, and wherein the plurality of pole members is at least partially disposed through the gripping surface. In some embodiments, the gripping surface is substantially flush with the gripping surface of portions of the at least partially disposed plurality of pole members. In some embodiments, the at least partially disposed plurality of pole members extend past the gripping surface. In some embodiments, the housing structure further comprises compartments that are substantially complementary in shape to house each magnet in the first arrangement of magnets and the second arrangement of magnets.

In some embodiments, the housing structure further comprises a plurality of magnetic shielding members, wherein the plurality of magnetic shielding members are positioned to reduce leakage of the magnetic flux not transferred to the object.

In some embodiments, the housing structure further comprises a plurality of magnetic flux guiding members, wherein the plurality of pole members has a maximum strength of the magnetic flux transferred to the object, wherein the plurality of magnetic flux guiding members are positioned to increase the maximum strength of the magnetic flux transferred to the object. In some embodiments, the plurality of magnetic flux guiding members comprise a ferromagnetic doped polymer. In some embodiments, the ferromagnetic doped polymer comprises carbonyl iron.

In some embodiments, the first arrangement of magnets and the second arrangement of magnets are each arranged circularly with substantially the same radius, wherein a first central axis of the first arrangement of magnets and a second central axis of the second arrangement of magnets are parallel, and wherein the first arrangement of magnets and the second arrangement of magnets are stacked adjacent to each other. In some embodiments, the first central axis and the second central axis are substantially co-axial. In some embodiments, the first arrangement of magnets is rotational about the first central axis to vary position relative to the second arrangement of magnets.

In some embodiments, the first arrangement of magnets and the second arrangement of magnets are each arranged in a Halbach array.

In some embodiments, the system comprises sensors for detecting a distance between the plurality of pole members and the object. In some embodiments, the sensors comprise proximity sensors. In some embodiments, the system comprises a tunable actuation system that moves the first arrangement of magnets, the second arrangement of magnets, or both. In some embodiments, the system comprises a controller operably coupled to the proximity sensors and the tunable actuation system. In some embodiments, the system is integrated in a robotic system.

In some embodiments, the magnetic flux is tunable between about 0 milliTeslas (mT) and 640 mT. In some embodiments, the system has a weight lift capacity of between about 10 kilograms (kg) and 25 kg.

In another aspect, the present disclosure provides a method for handling an object, comprising: (a) providing (1) a first arrangement of magnets, (2) a second arrangement of magnets, wherein the second arrangement of magnets and the first arrangement magnets are movable relative to one another, and (3) a plurality of pole members, wherein the plurality of pole members are (i) in a first magnetic interaction with the first arrangement of magnets and (ii) in a second magnetic interaction with the second arrangement of magnets, wherein each pole member of the plurality of pole members is configured to transfer magnetic flux caused by the first magnetic interaction and the second magnetic interaction to the object, and (b) moving one or more of the first arrangement of magnets and the second arrangement of magnets to vary their position relative to one another to vary the first magnetic interaction, the second magnetic interaction, or both, to vary the magnetic flux transferred to the object.

In some embodiments, the method comprises (a) adapting the magnetic flux to lift multiple objects, including the object, by moving the first arrangement of magnets and the second arrangement of magnets into one configuration in a first set of configurations, or (b) adapting the magnetic flux to lift only a single object, wherein the single object is the object, by moving the first arrangement of magnets and the second arrangement of magnets into one configuration in a second set of configurations, or (c) adapting the magnetic flux to lift release the object, by moving the first arrangement of magnets and the second arrangement of magnets into one configuration in a third set of configurations.

In some embodiments, the method comprises providing a housing structure, wherein the housing structure further comprises a gripping surface, and wherein the plurality of pole members is at least partially disposed through the gripping surface. In some embodiments, the gripping surface is substantially flush with the gripping surface of portions of the at least partially disposed plurality of pole members. In some embodiments, the at least partially disposed plurality of pole members extend past the gripping surface. In some embodiments, the housing structure further comprises compartments that are substantially complementary in shape to house each magnet in the first arrangement of magnets and the second arrangement of magnets. In some embodiments, the housing structure further comprises a plurality of magnetic shielding members, wherein the plurality of magnetic shielding members is positioned to reduce leakage of the magnetic flux not transferred to the object. In some embodiments, the housing structure further comprises a plurality of magnetic flux guiding members, wherein the plurality of pole members has a maximum strength of the magnetic flux transferred to the object, wherein the plurality of magnetic flux guiding members are positioned to increase the maximum strength of the magnetic flux transferred to the object. In some embodiments, the plurality of magnetic flux guiding members comprise a ferromagnetic doped polymer. In some embodiments, the ferromagnetic doped polymer comprises carbonyl iron.

In some embodiments, the first arrangement of magnets and the second arrangement of magnets are each arranged circularly with substantially the same radius, wherein a first central axis of the first arrangement of magnets and a second central axis of the second arrangement of magnets are parallel, and wherein the first arrangement of magnets and the second arrangement of magnets are stacked adjacent to each other. In some embodiments, the first central axis and the second central axis are substantially co-axial. In some embodiments, the first arrangement of magnets is rotational about the first central axis to vary position relative to the second arrangement of magnets. In some embodiments, the first arrangement of magnets and the second arrangement of magnets are each arranged in a Halbach array.

In some embodiments, the method further comprises providing sensors for detecting a distance between the plurality of pole members and the object. In some embodiments, the sensors comprise proximity sensors. In some embodiments, the method comprises providing a tunable actuation system that moves the first arrangement of magnets, the second arrangement of magnets, or both. In some embodiments, the method comprises providing a controller operably coupled to the proximity sensors and the tunable actuation system. In some embodiments, the method is performed by a robotic system.

In some embodiments, the magnetic flux is tunable between about 0 milliTeslas (mT) and 640 mT. In some embodiments, the object has a weight between about 10 kilograms (kg) and 25 kg.

In another aspect, the present disclosure provides a system for magnetically gripping an object, comprising a housing structure comprising (i) a first array of magnets and a second array of magnets disposed adjacent to and above the first array of magnets where the first array of magnets and the second array of magnets are rotatable relative to each other about a rotational axis, and (ii) a plurality of poles in magnetic communication with the first array of magnets, the second array of magnets, or both where a portion of each of the plurality of poles is at least partially disposed through a base of the housing structure. The system for magnetically gripping an object further comprises a gripping surface comprising the base of the housing structure and/or a surface of the portion of each of the plurality of poles at least partially disposed through the base. The system for magnetically gripping an object is alterable between at least three gripping states by rotating the first array of magnets, the second array of magnets, or both with respect to each other to at least three different positions, the at least three gripping states including an (1) on state having a first magnetic field, (2) an off state having a second magnetic field, and (3) a first intermediary state having a third magnetic field where the first magnetic field is greater than the third magnetic field, and wherein the third magnetic field is greater than the second magnetic field.

In some embodiments, in the on state, north poles of each of the first array of magnets are stacked adjacent to north poles of each of the second array of magnets. In some embodiments, in the off state, north poles of each of the first array of magnets are stacked adjacent to south poles of each of the second array of magnets. In some embodiments, in the first intermediary state, a north pole of a first magnet of the first array of magnets is stacked adjacent to a portion of a first pole of a second magnet of the second array of magnets and a portion of a second pole of a third magnet of the second array of magnets.

In some embodiments, the on state has a first magnetic depth with respect to an object, the off state has a second magnetic depth with respect to the object, and the first intermediary state has a third magnetic depth with respect to the object where the first magnetic depth, the second magnetic depth, and the third magnetic depth are different. In some embodiments, the system for magnetically gripping an object is alterable between at least six, but infinitely adjustable gripping states by rotating the first array of magnets, the second array of magnets, or both with respect to each other to at least six different positions, the at least six gripping states including a second intermediary state having a fourth magnetic field, a third intermediary state having a fifth magnetic field, and a fourth intermediary state having a sixth magnetic field, each of the first, second, third, fourth, fifth, and sixth magnetic fields is different.

In some embodiments, the system for magnetically gripping an object further comprises a controller operably coupled to the housing structure or components thereof where the controller is configured to adjust the system between the at least three gripping states by rotating the first array of magnets, the second array of magnets, or both with respect to each other to the at least three different positions.

In some embodiments, the system for magnetically gripping an object further comprises a proximity sensor configured to detect a distance between the object and the gripping surface, a state of engagement of the object by the gripping surface, or both.

In some embodiments, the system for magnetically gripping an object further comprises a controller operably coupled to the proximity sensor and the housing structure or components thereof where the controller is configured to receive one or more signals from the proximity sensor, and based at least in part on the one or more signals, adjust the system between the at least three gripping states by rotating the first array of magnets, the second array of magnets, or both with respect to each other to the at least three different positions.

In some embodiments, each pair of poles of the plurality of poles are disposed on opposite sides with respect to a central axis of the first array of magnets.

In some embodiments, the housing structure is coupled to or integrated in a robot.

In some embodiments, the system generates a tunable magnetic flux between about 0 milliTeslas (mT) and 640 mT.

In some embodiments, the system has a weight lift capacity of between about 10 kilograms (kg) and 25 kg.

In some embodiments, the system generates a tunable magnetic depth of up to 20 millimeters (mm).

In some embodiments, the gripping surface comprises a plurality of magnetically conductive coverings coupled to the portion of each of the plurality of poles extending through the base where the plurality of magnetically conductive covers are configured to interface the object during gripping. In some embodiments, the plurality of magnetically conductive coverings comprises a ferromagnetic doped polymer. In some embodiments, the ferromagnetic doped polymer comprise carbonyl iron.

In some embodiments, the surface of the portion of each of the plurality of poles is substantially flush with an outer surface of the base.

In some embodiments, the surface of the portion of each of the plurality of poles extends past an outer surface of the base.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1A:
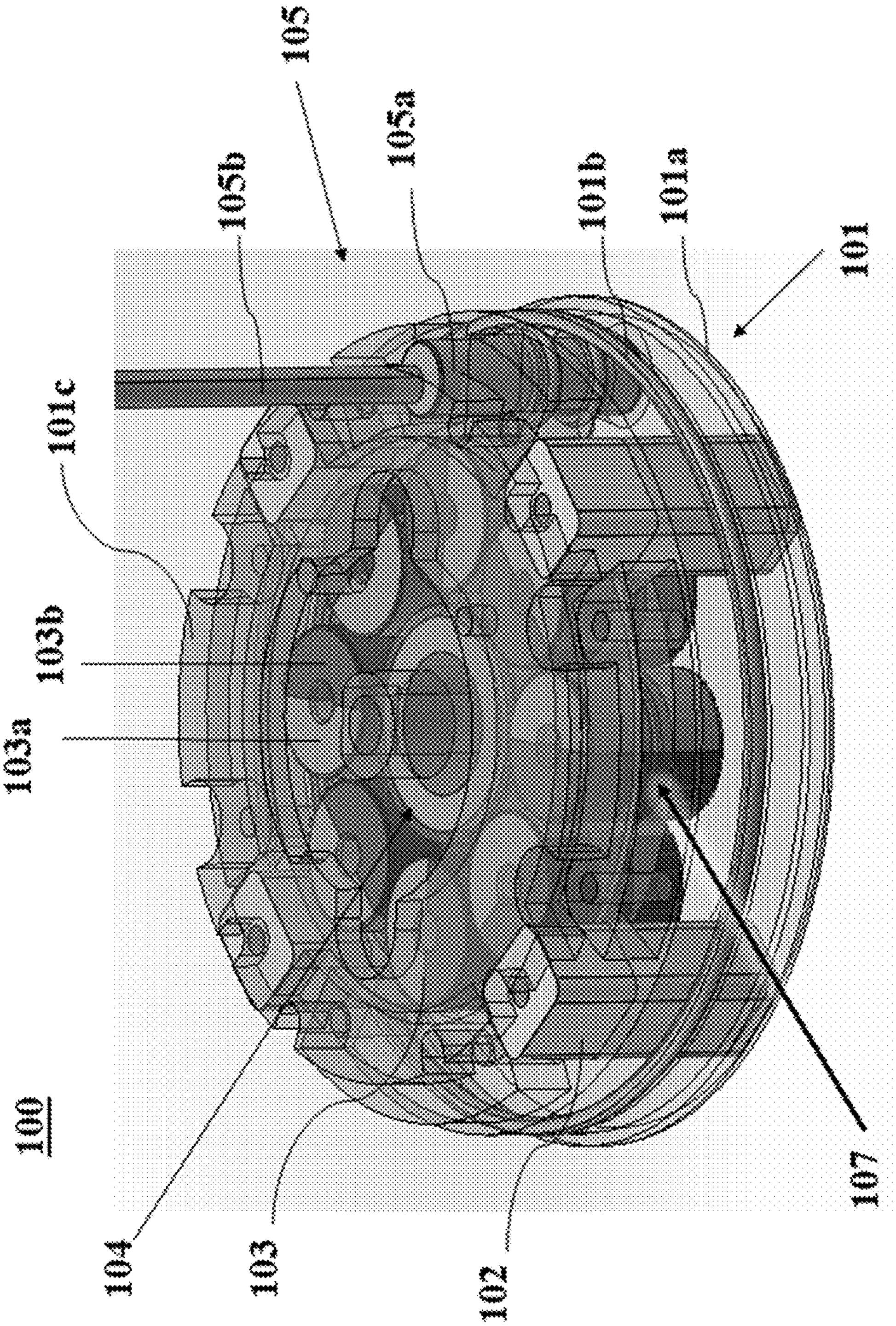
FIGS. 1A-1C illustrate an example of a top perspective view of a magnetic gripper in an on position, off position, and intermediate position, respectively, according to some embodiments described herein.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "magnetic field," as used herein, generally refers to the field of electromagnetic energy that may influence an electric charge and can be defined by the force exerted on a moving electrically charged particle. In some cases, magnetic field may be represented by the presence and the quantity of magnetic field lines.

The term "magnetic flux," as used herein, generally refers to a magnitude of total magnetic field passing through a given surface area. Magnetic flux density may measure the flux per unit area, such as in units of tesla (T), and can be measured by, for example, a flux meter, Gauss meter, or Tesla meter. Magnetic flux may be measured in units of, for example, tesla meters square ($Tm^2$). The denser the magnetic field lines, the larger the magnetic flux density and the magnetic flux in the corresponding surface area.

The term "magnetic interaction" as used herein, generally refers to the attractive and repulsive magnetic forces that exist between two objects.

The terms "magnetic strength," "magnetic power," "magnetic force," as used herein, generally refers to the strength or capacity of a magnetic system e.g., in engaging (e.g., holding, lifting, moving) ferromagnetic objects. The term "magnetic power" generally refers to a force required to pull a magnet from a metallic surface.

The term "magnetic depth," as used herein, generally refers to the depth of a magnetic field penetrated in a medium or substrate. The medium or substrate may be a workpiece comprising a ferromagnetic material. The medium or substrate may be any medium or substrate where the magnetic field is measured in (e.g., air). For example, a magnet or a set of magnets may have a first magnetic depth in a first direction that is larger than a second magnetic depth in a second direction.

The terms, "dynamic magnetic field" or "tunable magnetic field," as used herein, generally refer to a varying magnetic field. By controlling and/or changing the magnetic field, the magnetic flux, magnetic depth, and/or magnetic power of the system may be adjusted. A system having a dynamic or tunable magnetic field may have an "on" state, an "off" state, and one or more intermediate gripping states between the "on" and "off" states.

The terms "pole", "poles", "pole member", "pole members", "plurality of poles", or "plurality of pole members," as used herein, when in reference to a structural member, generally refers to a structural member or a plurality of structural members that transfer magnetic flux from one or more magnets to an object to be handled.

In some cases, the terms "pole", "poles", "magnetic pole", or "magnetic poles," as used herein, refers to the north (N) or the south (S) magnetic directions of embodied in an object. In some cases, as used herein, these terms refer to a portion of an object that is an N or S source of magnetic flux.

A magnetic system may comprise a magnetic gripping device, interchangeably referred to herein as "magnetic device," "magnetic gripper," or "magnetic gripper assembly." The magnetic gripping device may interface with a workpiece, interchangeably referred to herein as "object." In some cases, the magnetic gripping device may interact with a workpiece through another object, or a plurality of other objects. In some cases, the magnetic gripping device may interface with or interact with a plurality of a plurality of objects simultaneously.

In magnetic devices using electromagnets, the electric current that generates the magnetic field can be controlled to vary magnetic strength in the magnetic device. In magnetic devices that use permanent magnets, there are typically two gripping states, an "on" state and an "off" state. In the "on" state the device is capable of activating a magnetic field sufficient to engage or lift a ferromagnetic workpiece, and in the "off" state such magnetic field is deactivated. Beneficially, systems of the present disclosure provide magnetic systems that have tunable magnetic fields, which permits intermediate gripping state(s) between the "on" state and "off" state," thereby expanding applicability to different workpieces (or objects) and increasing control over such workpieces.

Further, a magnetic gripper may have a magnetic field depth that is fixed. For example, a magnetic gripper may generate a magnetic field that has a fixed depth of "d," and can engage any ferromagnetic materials that are within a "d" distance from a magnetic face of the gripper. This can be problematic in situations where a shallow depth or a dynamic depth is needed. For example, the workpiece may be a thin plate of ferromagnetic material stacked over another plate, a plurality of thin plates, or a workstation that may also have ferromagnetic properties; in these cases, a magnetic gripper with a fixed magnetic field that is deeper than the thickness of the workpiece plate may have difficulty interacting specifically with the workpiece without affecting other objects. Having a magnetic gripper with a tunable depth of field can resolve this issue.

The present disclosure provides systems and methods for magnetic systems with tunable magnetic fields, such as to engage a workpiece with high degree of control, and to engage workpieces with various thicknesses. A magnetic gripper may comprise a plurality of arrays of magnetic pieces, where at least one array is movable with respect to another array. The magnetic pieces can be permanent magnets. The magnetic pieces can be the source of a magnetic field and/or magnetic flux of the magnetic gripper. An array may comprise a plurality of permanent magnets arranged adjacent to one another in various geometric arrangements (e.g., in a row, rectangular, triangular, hexagonal, circular, etc.). An array of magnetic pieces may be arranged in a Halbach array. A magnetic system may comprise a plurality of Halbach arrays, such as two Halbach arrays stacked on top of each other, and rotatable with respect to each other.

The plurality of magnetic pieces may be arranged and operatively coupled to each other such that, in a first gripping state, the magnetic field is augmented, and in a second gripping state, the magnetic field is diminished. One or more magnetic pieces, or arrays thereof, may transition, rotate, or otherwise move relative to other magnetic pieces, or arrays thereof, between the first gripping state and the second gripping state. The magnetic system may acquire various intermediary gripping states (e.g., having different magnetic fields) corresponding to various stages of movement (e.g., transitioning, rotation, etc.) of the one or more magnetic pieces, or arrays thereof, relative to other magnetic pieces, or arrays thereof. One of the gripping states in which the magnetic field is cancelled or significantly diminished, or at a minimum, compared to other gripping states, may be referred to as the "off" state. One of the gripping states in which the magnetic field is significantly augmented, or at a maximum, compared to other states, may be referred to as the "on" state.

In some instances, the magnetic pieces in an array may be arranged in a substantially circular shape forming a disc, a donut, or a ring. In some instances, the magnetic pieces in an array may be arranged in any shape with radial symmetry. A magnetic piece can be a permanent magnet with a north pole (N) and a south pole (S). In some instances, the permanent magnets may be symmetrical in shape such that the N and S poles are substantially equal in dimension. Alternatively, the permanent magnets may be asymmetrical in shape. Alternatively, the permanent magnets can be symmetrical in shape with N and S poles that are not substantially equal in dimension.

The N-S poles of each magnetic piece in an array may be oriented to achieve specific magnetic field control, such as in a Halbach array. For example, a magnetic gripper comprises two radially symmetrically shaped Halbach arrays stacked on top of each other, one array movable with respect to the other array. Within each array level, the N pole of each magnetic piece is oriented at an angle which increases in fixed increments in the clockwise direction (or counterclockwise direction) within the array, with respect to a reference radial axis of the respective magnetic piece (which reference radial axes are parallel across the respective magnetic pieces). For example, where an array has 8 magnetic pieces, the N pole of a first magnetic piece is oriented at 0° with respect to a reference radial axis, the N pole of a second magnetic piece immediately adjacent to the first magnetic piece in the clockwise direction is orientated at 45° with respect to a reference radial axis, the N pole of a third magnetic piece immediately adjacent to the second magnetic piece in the clockwise direction is orientated at 90° with respect to a reference radial axis, the N pole of a fourth magnetic piece immediately adjacent to the third magnetic piece in the clockwise direction is orientated at 135° with respect to a reference radial axis, the N pole of a fifth magnetic piece immediately adjacent to the fourth magnetic piece in the clockwise direction is orientated at 180° with respect to a reference radial axis, the N pole of a sixth magnetic piece immediately adjacent to the fifth magnetic piece in the clockwise direction is orientated at 225° with respect to a reference radial axis, the N pole of a seventh magnetic piece immediately adjacent to the sixth magnetic piece in the clockwise direction is orientated at 270° with respect to a reference radial axis, and the N pole of a eights magnetic piece immediately adjacent to the seventh magnetic piece in the clockwise direction is orientated at 315° with respect to a reference radial axis. In another example, where an array has 4 magnetic pieces, the N pole of a first magnetic piece is oriented at 0° with respect to a reference radial axis, the N pole of a second magnetic piece immediately adjacent to the first magnetic piece in the clockwise direction is orientated at 90° with respect to a reference radial axis, the N pole of a third magnetic piece immediately adjacent to the second magnetic piece in the clockwise direction is orientated at 180° with respect to a reference radial axis, and the N pole of a fourth magnetic piece immediately adjacent to the third magnetic piece in the clockwise direction is orientated at 270° with respect to a reference radial axis.

Provided herein are systems and methods for generating dynamic magnetic fields using switchable permanent magnets in a magnetic gripper. The properties of the magnetic pieces (e.g., shape, material, weight) and the arrangement of magnetic pieces can affect the depth and strength of the magnetic field as well as the direction of the magnetic flux in the gripper. Magnetic pieces can be arranged to generate switchable magnets. Magnetizable poles can also be used in a gripper device to direct the magnetic flux.

Figure 1B:
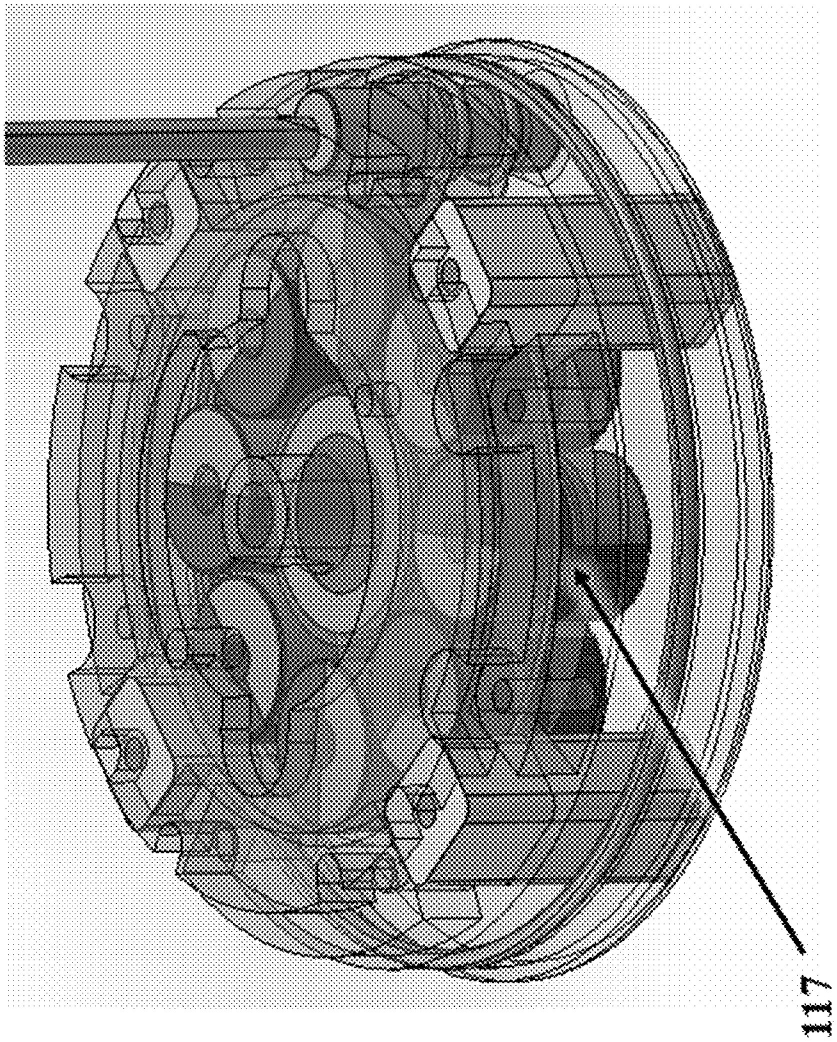
Figure 1C:
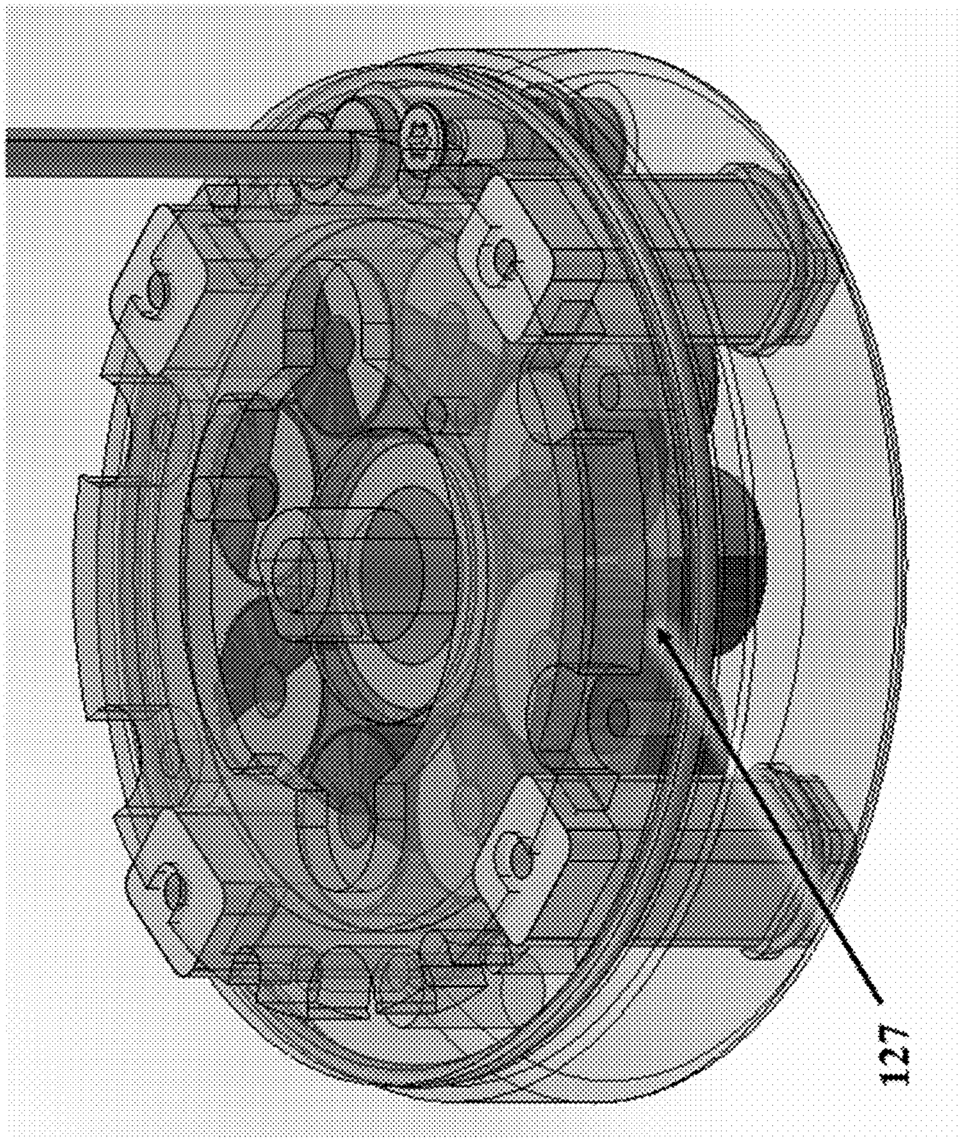

FIGS. 1A-C illustrate an example of a magnetic gripper assembly to generate dynamic magnetic field, in an "on" state, an "off" state, and an intermediary gripping state, respectively. FIG. 1A shows a perspective top view of the magnetic gripper assembly 100 in an "on" state.

The assembly 100 may comprise a housing structure 101 that can house and support various components in the assembly 100. The housing structure 101 may comprise a base 101*a*, a support ring 101*b*, and a cap piece 101*c*. The support ring 101*b* may be attached or coupled to the base 101*a*. The cap piece 101*c* may be attached or coupled to the support ring 101*b* and/or the base 101*a*. The cap piece 101*c* can hold various components in the assembly 100 together. The housing structure 101 may magnetically insulate various magnetic components disposed within the housing structure 101. The housing structure 101 may be made from non-magnetizable materials. For example, the housing structure 101 may be plastic, aluminum, copper, copper alloys (e.g., bronze), carbon composite or other non-ferrous, non-cobalt, non-nickel material. The housing structure 101 may be sized for various applications. For example, a maximum diameter of the base 101*a* may be on the order of 0.01 meters (m), 0.1 m, 1 m, 10 m, 100 m, or more. In some instances, a maximum dimension (e.g., diameter) of the housing structure 101 may be at least about 10 millimeters (mm), 20 mm, 30 mm, 40 mm, 50 mm, 60 mm, 70 mm, 80 mm, 90 mm, 100 mm, 200 mm, 300 mm, 400 mm, 500 mm, 600 mm, 700 mm, 800 mm, 900 mm, 1000 mm (or 1 m), or greater. Alternatively or in addition, a maximum dimension (e.g., diameter) of the housing structure 101 may be at most about 1000 mm (or 1 m), 900 mm, 800 mm, 700 mm, 600 mm, 500 mm, 400 mm, 300 mm, 200 mm, 100 mm, 90 mm, 80 mm, 70 mm, 60 mm, 50 mm, 40 mm, 30 mm, 20 mm, 10 mm, or less. In an example, a maximum dimension of the housing structure 101 is about 71 millimeters.

The assembly 100 may further comprise a plurality of magnetizable poles 102. The plurality of magnetizable poles 102 may be in magnetic communication with at least a first array of magnetic pieces 103 housed inside the housing structure 101. For example, the plurality of magnetizable poles 102 may be in magnetic communication with an array of magnetic pieces 103 that is fixed with respect to the housing structure 101. The fixed array may be the bottom array. The poles may be in contact or in close proximity with respect to the array. In some instances, a gap may be placed between the poles and the arrays for functional convenience. The poles comprise magnetically conductive material. The poles 102 may be fixed with respect to the housing structure 101. The poles 102 may penetrate or pass through the base 101*a* (FIG. 2) such that a respective surface of the poles 102 are exposed external to the housing structure 101. A surface of the exposed end may be substantially flush with an outer surface of the base. A surface of the exposed end may extend past the outer surface of the base. In some cases, the poles may not penetrate or pass through the base, but be in magnetic communication through the base through one or more magnetically conductive intermediary pieces (e.g., a magnetically conductive covering) that penetrates or passes through the base. An exposed end of the poles 102 can contact the workpiece. The exposed end may also comprise a magnetically conductive covering attached thereto to conduct the magnetic flux to workpieces, as described elsewhere herein. Such magnetic conductive coverings may be particularly beneficial for conducting or modulating the magnetic flux to workpieces that have more challenging or irregular geometry (e.g., irregular shapes, curved surface-containing shapes, angled surface-containing shapes, cylindrical, spherical, etc.). The magnetizable poles may be used to transfer magnetic flux from a plurality of magnets housed within the housing structure 101, when activated, to a workpiece via the exposed end. The assembly 100 may comprise at least two magnetizable poles 102. The assembly 100 may comprise an even number of poles 102. In some instances, the assembly 100 may comprise at most 100 poles. The assembly 100 may comprise at least about 2, 4, 6, 8, 10, 12, 14, 16, 18, 20, 30, 40, 50, 60, 70, 80, 90, 100 poles or more. The assembly 100 may comprise at most about 100, 90, 80, 70, 60, 50, 40, 30, 20, 18, 16, 14, 12, 10, 8, 6, 4, or 2 poles. A pair of poles 102 may be placed along the circumference of the housing structure opposite from one another. In some instances, the distance between two neighboring poles 102 may be at least 5 arc degrees (°) and at most 180° of the minor arc. The arc distance between two neighboring poles 102 may be at most about 180°, 175°, 170°, 165°, 160°, 155°, 150°, 145°, 140°, 135°, 130°, 125°, 120°, 115°, 110°, 100°, 95°, 90°, 85°, 80°, 75°, 70°, 65°, 60°, 55°, 50°, 45°, 40°, 35°, 30°, 25°, 20°, 15°, 10°, 5°, 4°, 3°, 2°, 1° or less. The arc distance between two neighboring poles 102 may be at least about 1°, 2°, 3°, 4°, 5°, 10°, 15°, 20°, 25°, 30°, 35°, 40°, 45°, 50°, 55°, 60°, 65°, 70°, 75°, 80°, 85°, 90°, 95°, 100°, 105°, 110°, 115°, 120°, 125°, 130°, 135°, 140°, 145°, 150°, 155°, 160°, 165°, 170°, 175°, 180°. In some cases, the poles may be configured in an almost contiguous array.

The assembly 100 further comprises a plurality of magnetic pieces 103. The magnetic pieces 103 may be permanent magnets. The magnetic pieces 103 can each have a north (N) pole (e.g., 103*a*) and a south (S) pole (e.g., 103*b*). Alternatively, a magnetic piece may have a plurality of poles. For example, a magnetic piece may have two N poles and two S poles. A magnetic piece may have more than two N poles and more than two S poles. A magnetic piece may have three, four, five, six, or more N poles and three, four, five, six, or more S poles. A magnetic piece of the plurality of magnetic pieces may have any shape, size, or form. The plurality of magnetic pieces can be arranged into at least two separate arrays, including at least one movable array. The at least two separate arrays may comprise a fixed array. The fixed array may be fixed relative to the housing structure 101. The movable array may comprise magnetic pieces that are movable relative to another array and/or the housing structure 101. For example, the movable array can be rotatable with respect to the fixed array. In some instances, the movable array is stacked adjacent and above the fixed array. Alternatively, the movable array is stacked adjacent and beneath the fixed array. In some instances, the fixed array and the movable array may share the same central axis, the movable array being rotatable about the central axis. In some instances, the fixed array and the movable array may be identical in arrangement, shape, and size. Alternatively, the fixed array and the movable array may have different array arrangements, shapes, and sizes. In some instances, as illustrated in FIGS. 1A-1C, both arrays of magnets can be arranged in a ring format. Alternatively, the arrays of magnets can be arranged in any other formats, e.g., a polygonal radially symmetrical format. The magnets 103 may be placed around and adjacent to a center piece 104. The center piece may be configured to incorporate or couple to an attachment. For example, the attachment may comprise or be coupled to a movement component, such as a motor, actuator, arm, or a gear. The attachment may comprise or be coupled to a bearing or a bushing. The bearing or the bushing may be placed on the inner diameter of the center piece 104. Alternatively, or in addition, the bearing or the bushing may be placed on the outer diameter of the center piece 104. A first array of magnetic pieces may be disposed adjacent to the base 101*a*. A second array of magnetic pieces may be disposed between the first array of magnets and the cap piece 101*c*. The assembly 100 may comprise a third array, for example, in a same stack with the first and second arrays. The assembly 100 may comprise a fourth array or more. In some instances, an array of magnets may comprise 4 to 8 magnets. In some instances, an array of magnets may comprise 2 to 16 magnets. In some instances, an array of magnets may comprise at least 2, 3, 4, 5, 6, 7, 8, 9, 10, 11, 12, 13, 14, 15, 16, 17, 18, 19, 20, 21, 22, 23, 24, 25, 30, 35, 40, 45, 50, 60, 70, 80, 90, 100, or more magnets. Alternatively or in addition, an array of magnets may comprise at most 100, 90, 80, 70, 60, 50, 45, 40, 35, 30, 25, 24, 23, 22, 21, 20, 19, 18, 17, 16, 15, 14, 13, 12, 11, 10, 9, 8, 7, 6, 5, 4, 3, or 2 magnets.

At least one array of the plurality of arrays of magnetic pieces in assembly 100 may be moveable with respect to another array. The first array of magnetic pieces may be movable while the second array is stationary. The second array of magnetic pieces may be moveable while the first array is stationary. Both the first array and the second array can be moveable. The first and the second array may rotatably move relative to one another. The movable array(s) may be rotatable about a rotational axis which crosses the center of the array (e.g., ring) and is normal to the widest surface the array (e.g., ring). The rotational axis may be another axis (e.g., non-central axis). During movement of one or more arrays, the magnetic pieces of the first array and the second array can be positioned such that the respective central axis of each magnet in the first array is substantially superimposed over the respective center axis of at least one of the magnetic pieces in the second array. This may also be referred to herein as stacking. Alternatively, the arrays may not be stacked.

The rotatable motion of the first array and the second array relative to one another can position the magnetic pieces in the respective arrays substantially stacked, partially stacked, or not stacked. In the position where similar magnetic poles of the magnetic pieces in the first array and the second array are substantially stacked (aligned) 107 (e.g., S-S and N-N), shown in FIG. 1A, the magnetic flux may increase and be transferred external to the housing 101 via the poles 102. The external magnetic flux and/or the external magnetic field in this position may be the maximum amount, or significantly augmented magnitude, that the device can generate. The poles 102 may become intense magnetic N and S poles; this position may correspond to a fully activated gripping state of the gripper. A gripping surface may comprise the base 101*a*, a first exposed end of a first pole (of the poles 102), and a second exposed end of a second pole (of the poles 102). When the gripping surface contacts a workpiece, the magnetic flux may travel from the first exposed end of the first pole, short circuit through the workpiece, and reach the other exposed end of the second pole, resulting in a strong gripping force between the poles and the workpiece. Beneficially, the resulting magnetic field is shallow, but intense, permitting strong gripping of immediately adjacent (or having short depth) object(s).

When the gripping surface contacts an object, the magnetic flux may travel from the first exposed end of a first pole member polarized in one magnetic direction (e.g. North), short circuit through the object, and reach an exposed end of a second pole polarized in the other magnetic direction (e.g. South), resulting in a strong gripping force between the pole members and the object. Beneficially, the resulting magnetic field is shallow, but intense, permitting strong gripping immediately adjacent (or having short depth) object(s).

When the gripping surface contacts an object, the magnetic flux may travel from the first exposed end of a first pole member polarized in one magnetic direction (e.g. South), short circuit through the object, and reach an exposed end of a second pole polarized in the other magnetic direction (e.g. North), resulting in a strong gripping force between the pole members and the object. Beneficially, the resulting magnetic field is shallow, but intense, permitting strong gripping immediately adjacent (or having short depth) object(s).

FIG. 1B shows another example of the assembly 100, where the magnetic pieces in the first array may be substantially aligned with the magnetic pieces in the second array with their opposite poles stacked adjacent to one another 117 (e.g., N-S, S-N). In this position, the magnetic fields of the individual, stacked magnetic pieces can cancel one another and the magnetic flux may be dampened. This position may correspond to a deactivated state or an "off" state of the system. In the off state, the external magnetic flux and/or field of the system may be at a minimum. In the off state, the external magnetic flux and/or field of the system may be substantially close to zero.

FIG. 1C shows an example of the assembly 100, where the magnetic pieces in the first array and the magnetic pieces in the second array are partially aligned 127. A magnet in the second array may be positioned to partially align with two adjacent magnetic pieces in the first array in a plurality of intermediate positions. For example, a N pole and a S pole of a magnet in the second array may partially or substantially align with a S pole of a first magnet in the first array, and the N pole of a second magnet in the first array, respectively. In one example, a N or a S pole of a magnet in the second array may partially align with a N or a S pole of two adjacent magnetic pieces in the first array. In another example, a N or a S pole of a magnet in the second array may partially align with a N and a S pole of two adjacent magnetic pieces in the first array. In another example, a N and a S pole of a magnet in the second array may partially align with a N and a S pole of two adjacent magnetic pieces in the first array. In another example, a N and a S pole of a magnet in the second array may partially align with a N or a S pole of two adjacent magnetic pieces in the first array. The surfaces of two adjacent magnetic pieces in the first array may be partially covered by a magnet from the second array in equal portions. The surfaces of two adjacent magnetic pieces in the first array may be partially covered by a magnet from the second array in unequal portions. The common surface area between a magnet from the second array and the two adjacent magnetic pieces in the first array may be equally distributed between the two adjacent magnetic pieces in the first array. The common surface area between a magnet from the second array and the two adjacent magnetic pieces in the first array may be distributed between the two adjacent magnetic pieces in the first array unequally. The common surface area between a magnet from the second array and the two adjacent magnetic pieces in the first array may be distributed between the two adjacent magnetic pieces in the first array at 5%-95%, 10%-90%, 20%-80%, 25%-85%, 30%-70%, 35%-65%, 40%-60%, 45%-55%, or any other distributions. These intermediate positions may correspond to "intermediate" states of the magnetic gripper.

In the intermediate states the magnetic gripper may exert a portion of the maximum external magnetic flux and/or external magnetic field. In some instances, the portion of exerted magnetic flux/filed may be proportional to the degree of alignment. In an intermediate state, the magnetic gripper may exert at most about 95%, 90%, 85%, 80%, 75%, 70%, 65%, 60%, 55%, 50%, 45%, 40%, 35%, 30%, 25%, 20%, 15%, 10%, 9%, 8%, 7%, 6%, 5%, 4%, 3%, 2%, 1%, or less of the external magnetic flux and/or magnetic field compared to the fully activated state. Alternatively or in addition, in an intermediate state, the magnetic gripper may exert at least about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, or more of the external magnetic flux and/or magnetic field compared to the fully activated state. For example, in one of the plurality of intermediate states the net external magnetic flux of the magnetic gripper may be about 10%-20% of the overall net external magnetic flux of the magnetic gripper in the fully activated state. For example, in one of the plurality of intermediate states the overall net external magnetic flux of the magnetic gripper may be about 20%-30% of the overall net external magnetic flux of the magnetic gripper in the fully activated state. For example, in one of the plurality of intermediate states the overall net external magnetic flux of the magnetic gripper may be about 30%-40% of the overall net external magnetic flux of the magnetic gripper in the fully activated state. For example, in one of the plurality of intermediate states the overall net external magnetic flux of the magnetic gripper may be about 40%-50% of the overall net external magnetic flux of the magnetic gripper in the fully activated state. For example, in one of the plurality of intermediate states the overall net external magnetic flux of the magnetic gripper may be about 50%-60%, 60%-70%, 70%-80%, 80%-90%, or 90%-99.99% of the overall net external magnetic flux of the magnetic gripper in the fully activated state. For example, in one of the plurality of intermediate states the overall net external magnetic flux of the magnetic gripper may be about 12%, 17%, 22%, 27%, 32%, 37%, 42%, 47%, 52%, 57%, 62%, 67%, 72%, 77%, 82%, 87%, 92%, or 97% of the overall net external magnetic flux of the magnetic gripper in the fully activated state. It will be appreciated that the systems and devices of the present disclosure are readily scalable to accommodate any scale of tunable magnetic flux magnitudes. In one operating example, the magnetic flux is tunable between 0 milliteslas (mT) and 640 mT. In other operating examples, the magnetic flux generated by the system may range on the order of 0.01 mT, 0.1 mT, 1 mT, 10 mT, 100 mT, 1000 mT (or 1 T), 10 T, 100 T or greater, with tunability across one order of magnitude, two orders of magnitude, three orders of magnitude, or greater. The magnetic flux may be tunable in any increments.

The moveable arrays of magnets (e.g., the first array, the second array, or both) can be moved (e.g., rotated) using an actuator. The actuator may be a tunable motor. The motor may be an electric motor. The motor may be a pneumatic motor. The electric motor may be a DC motor (e.g., brushless, brushed, etc.) or an AC motor (e.g., induction, synchronous, or repulsion). The electric motor can be a stepper, step, or stepping motor. The stepper motor can be controlled via an open-loop controller system without the need for a position sensor. Therefore, the arrays may be positioned to the different states using an open-loop controller system (e.g., commanded by pulses from a stepper driver or other timing system). The stepper motor can be controlled via a closed-loop controller system (e.g., driven and then sensed by a sensor, e.g., Hall sensor). The control system may take the form of a proportional-integral-derivative (PID) system, fuzzy logic, machine learning (e.g., neural network) or other control systems. The gripping system may be coupled to or be integrated in a robot, such as a robotic arm, with any degree of freedom such as to facilitate approaching or departing of the gripping surface with respect to an object, or moving of a gripped object from one location to another location.

The assembly 100 may also comprise a proximity sensor system, also referred to herein as sensor 105. The sensor 105 may be disposed inside of the housing structure. The sensor 105 may be disposed on the outside of the housing structure 101. The sensor 105 may be disposed partially inside and partially outside of the housing structure 101. The sensor 105 may be placed at or near the circumference of the housing structure 101. The sensor 105 may traverse through the base 101*a* of the housing structure 101. A portion of the sensor 105*a* may be disposed at an opening in the base 101*a* in such a way that the sensor 105*a* may be configured to sense an object at or near the base 101*a* (see FIG. 2). The sensor 105 may comprise a narrower attachment piece 105*b* which may be coupled to the cap piece 101*c*. The narrower attachment piece 105*b* can house and protect wires that are required to operate the sensor 105. The proximity sensor 105 may be any time of sensor, such as photoelectric, ultrasonic, inductive, or capacitive. The proximity sensor 105 may be a diffuse photoelectric sensor, a retro reflective photoelectric sensor, or one or more different types of photoelectric sensors work together. The proximity sensor 105 may use inductive, sonic, laser, infrared, or other technologies to detect objects. The proximity sensor 105 can identify the presence of an object using a laser. While one sensor system is illustrated in FIGS. 1A-1C, it will be appreciated that there may be any number of sensors, of the same type or of different types, to collect one or more signals with respect to the object.

The sensor 105 can detect moving objects and/or stationary objects. The sensor 105 can detect objects when the magnetic gripper is operating, moving, and/or rotating with respect to the object, for example. The sensor 105 can detect objects when the magnetic gripper is not moving, rotating, and/or operating with respect to the object. The sensor 105 can detect objects when the magnetic gripper is in the "on" or "off" state. The sensor 105 may detect an object from at least about 0.1 centimeter (cm), 0.2 cm, 0.3 cm, 0.4 cm, 0.5 cm, 0.6 cm, 0.7 cm, 0.8 cm, 0.9 cm, 1 cm, 2 cm, 3 cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 150 cm, 200 cm, 250 cm, 300 cm, 350 cm, 400 cm, 450 cm, 500 cm, 550 cm, 600 cm, 650 cm, 700 cm, 750 cm, 800 cm, 850 cm, 900 cm, 950 cm, 1000 cm, or more away from the gripping surface of the magnetic gripper. The sensor 105 may detect an object from at most about 1000 cm, 950 cm, 900 cm, 850 cm, 800 cm, 750 cm, 700 cm, 650 cm, 600 cm, 550 cm, 500 cm, 450 cm, 400 cm, 350 cm, 300 cm, 250 cm, 200 cm, 150 cm, 100 cm, 95 cm, 90 cm, 85 cm, 80 cm, 75 cm, 70 cm, 65 cm, 60 cm, 55 cm, 50 cm, 45 cm, 40 cm, 35 cm, 30 cm, 25 cm, 20 cm, 19 cm, 18 cm, 17 cm, 16 cm, 15 cm, 14 cm, 13 cm, 12 cm, 10 cm, 9 cm, 8 cm, 7 cm, 6 cm, 5 cm, 4 cm, 3 cm, 2 cm, 1 cm, 0.9 cm, 0.8 cm, 0.7 cm, 0.6 cm, 0.5 cm, 0.4 cm, 0.3 cm, 0.2 cm, 0.1 cm, or less away from the gripping surface of the magnetic gripper.

A ferromagnetic workpiece can be approached and sensed by the senor 105, which can trigger the motor to switch the magnets to an "off" state or tune them to decrease the magnetic field. If the gripper is in an "on" state or at a state that has too strong of a magnetic field when at some distance or range thereof from a workpiece, the magnetic fields may create a missile hazard due to the presence of other ferromagnetic objects. It may create a pinch hazard (e.g., to pinch the fingers or other bodily parts or clothing of an operator). It may also accelerate the workpiece to the gripper excessively, thus damaging the workpiece, the gripper, or both. When the gripper is at a safe proximity to the workpiece, as sensed by the sensor, beneficially, the magnets may be positioned in a predetermined position to tune the gripper to a useful state at such distance. Such usable state may be an intermediate state or an "on" state for example. In some instances, the operations of sensing and tuning the gripper state may be repeated any number of times as the gripper approaches the workpiece, or the workpiece approaches the gripper to optimize the magnetic field applied at a given distance between the gripper and workpiece. In some instances, the intermediate state may be selected based on the depth of the magnetic field needed to precisely lift a plate from a plurality of plates. The tunable gripper can engage (e.g., lift) a predetermined number of workpieces (e.g., plates). The tunable gripper can engage (e.g., lift) almost exactly 1, 2, 3, 4, 5, 6, 7, 8, 9, 10, 15, 20, 25, 30, 50, or 100 workpieces at a time. The intermediate state may be selected based on the capacity (e.g., lifting force) required to engage the workpiece. The predetermined intermediate position may activate the gripper to exert a portion of the capacity of the fully activated state. For example, the gripper can lift a 1 mm thick steel sheet while leaving a 0.5 mm steel sheet below it unpicked. After engaging the workpiece (e.g., lifting a plate from a stack of plates) the magnetic capacity of the gripper may be maintained or changed. For example, the engagement of the workpiece may be detected by the proximity sensor or another sensor. For example, to safely move a workpiece (e.g., a plate) the magnetic gripper may be fully activated by adjusting the magnet position, to increase the magnetic interaction between the gripper and the workpiece. To release, the magnetic power may be reduced by changing the position of the magnetic arrays.

It will be appreciated that the systems and devices of the present disclosure are readily scalable to accommodate any scale of tunable magnetic depth. In one operating example, the magnetic depth is tunable up to about 10 mm. In another operating example, the magnetic depth is tunable up to about 20 mm. In other operating examples, the magnetic depth generated by the system may range on the order of 0.1 mm, 1 mm, 10 mm, 100 mm, 1000 mm (or 1 m), 10 m, 100 m or greater, with tunability across one order of magnitude, two orders of magnitude, three orders of magnitude, or greater. The magnetic depth may be tunable in any increments.

It will be appreciated that the systems and devices of the present disclosure are readily scalable to accommodate any scale of weight lift capacity (e.g., for weight of the object gripped). In one operating example, the weight lift capacity is between about 10 kilograms (kg) and 25 kg. In other operating examples, the weight lift capacity may range on the order of 0.01 kg, 0.1 kg, 1 kg, 10 kg, 100 kg, 1000 kg, or greater.

Figure 2:
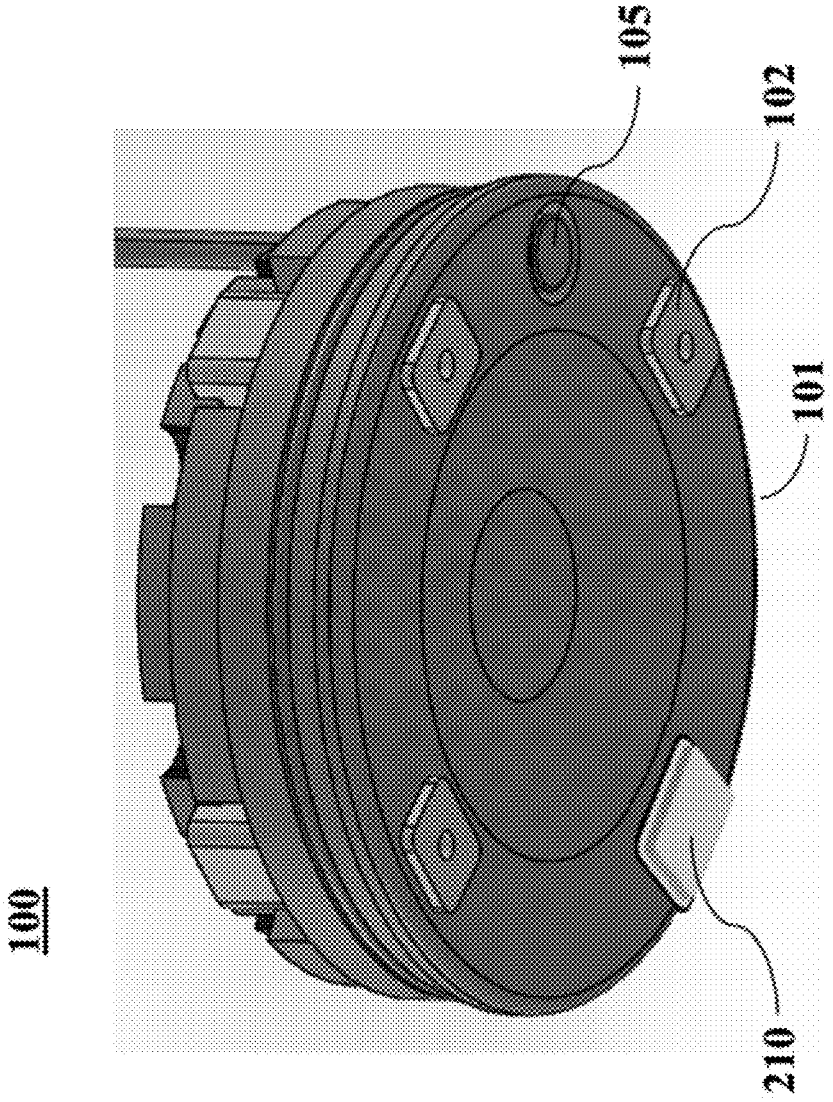
FIG. 2 illustrates a bottom perspective view of a magnetic gripper according to some embodiments described herein.

The gripping surface may further comprise a magnetically conductive covering or a plurality of magnetically conductive coverings configured to interface an object to be gripped. A magnetically conductive covering (e.g., 210) may be in contact or in close proximity with the base and/or one or more exposed ends of the poles (e.g., 102 in FIG. 2). For example, as shown in FIG. 2, a pole end 102 may be covered with a magnetically conductive covering 210. The magnetically conductive covering may be configured to conform to complex shapes and forms, such as difficult geometry, of a surface of an object that is gripped. The magnetically conductive covering may be configured to conform to the shape and form of the exposed end of a pole. The plurality of magnetically conductive covering may comprise conductive cushioning material. The covering may facilitate protection of the object and/or the poles by cushioning the interface during gripping.

The covering may be composed of polymeric material (e.g., rubber). The polymeric material can be doped with a chemically inert material, such as a carbon-containing material. In some examples, the carbon-containing material is carbon (e.g., carbon powder) and/or carbon nanostructures. The polymeric material can be doped with a ferromagnetic material, such as carbonyl iron or organometallic complexes containing $Cr^{2+}$, $Mn^{2+}$, or $Fe^{2+}$ bound to aromatic rings. The ferromagnetic doped polymeric material may have electromagnetic shielding properties. The polymeric material can be an elastomer such as polysiloxane (silicone rubber), polyurethane. The inert material or ferromagnetic material may be selected so as not to interfere with the elastomer curing process. Upon curing, the polymeric material can be rendered flexible. Creation of an elastomeric object (e.g., covering) can begin with a raw elastomer fluid in liquid form (e.g., doped with the materials described herein), which can then be formed and cured.

The covering can be coupled to an exposed end of the pole. For example, the covering can be completely or partially wrapped around the exposed end of the pole. In some examples, the covering is coupled to an exposed end to at least cover a surface (e.g., bottom surface) that interacts with the object to be gripped. An individual covering may be coupled to each exposed end of the pole. Alternatively, an individual covering may be coupled to some of the exposed ends on the gripping surface. Alternatively, a single covering may be coupled to a plurality of exposed ends on the gripping surface. Alternatively, a plurality of coverings may be coupled to an exposed end on the gripping surface. The covering and the pole may be fastened together with any useful fastening mechanism. Such fastening may be permanent. Alternatively, such fastening may be temporary, such that the covering is readily removable from the exposed end of the pole. A fastener may comprise conductive material or non-conductive material (e.g., plastic zipper). Advantageously, the covering can protect the magnetic poles at the gripping surface from debris (e.g., ferromagnetic dust or powders, or other debris). The covering can be configured to be easily removable for cleaning and/or replacing. Additionally, the covering can protect an object (e.g., a workpiece such as a metal sheet) during the lifting and moving process by eliminating direct contact between the object and the gripping surface (e.g., pole ends).

The covering may be further configured to modulate the electromagnetic field around the pole ends. In some embodiments, the covering may be further configured to direct magnetic field towards the pole ends. For example, in the off position the pole ends of the magnetic gripper may have a residual magnetic field. The covering, doped with ferromagnetic material, can act as an electromagnetic shield and reduce or substantially eliminate any residual magnetism left in the pole ends. The extent of the magnetic field reduction can be tuned by varying the amount of dopant used in the covering. The amount of dopant used in the covering can be inversely proportional to the extent of magnetic field reduction by the cover. For example, a covering with more dopant can be used to reduce the magnetic field to a lesser degree than a covering with less dopant. For example, to eliminate the residual magnetic field or to maximally reduce the magnetic field a covering which has no dopant can be used. In some embodiments, the covering can be a magnetic flux shielding member. In some embodiments, the covering can be a magnetic flux guiding member.

Figure 3:
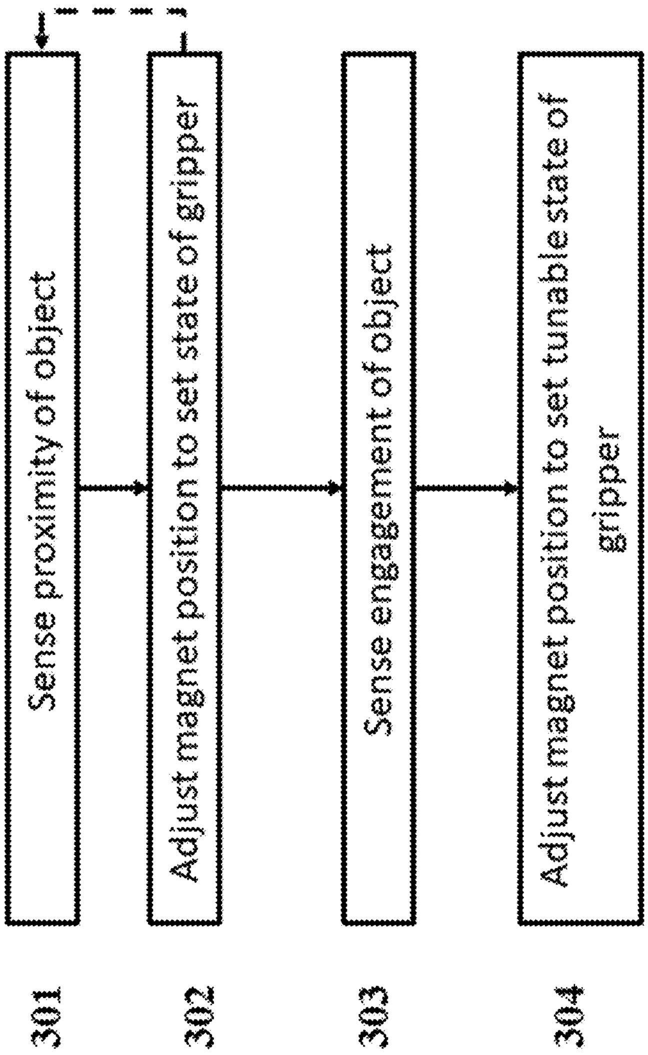
FIG. 3 illustrates an example method for gripping an object.

FIG. 3 illustrates an example method for gripping an object. A gripper comprising a gripping surface may be provided, as described elsewhere herein. The gripping surface may be provided in a first state. The first state may be an "off" state. The gripper may exert a first magnetic field in the first state. The first magnetic field may be zero or near zero in magnetic flux. The gripping surface may comprise a sensor configured to sense the proximity of an object (301). One or more signals collected by the sensor, indicative of proximity, may be transmitted to a controller, which may adjust magnetic array positions to tune the gripper to a second state (302), based at least in part on the proximity (e.g., distance between) between the gripping surface and the object. In the second state, the gripper may exert a second magnetic field different than the first magnetic field. The second magnetic field may be greater than the first magnetic field. The gripper may be tuned to the second state based on properties of the object (e.g., a thickness or other dimension of the object), a number of objects (including the object) to engage, and the like. Optionally, as the distance between the gripping surface and the object changes, processes 301 and 302 may be repeated to optimize the magnetic field applied to the object at a given distance. At or within a safety distance, the object may be engaged by the gripper. Such engagement can be sensed, such as by the sensor or another sensor (303). Upon engagement, a controller may adjust magnetic array positions to tune the gripper to a third state (304). In the third state, the gripper may exert a third magnetic field different than the second magnetic field. The third magnetic field may be greater than the second magnetic field. For example, a lower magnetic field may be applied during engagement to facilitate isolation of the object from another object or a plurality of objects (e.g., to isolate a sheet from a plurality of sheets), and after engagement the magnetic field increased to secure gripping of the object and subsequent movement of the gripped object.

Figure 5:
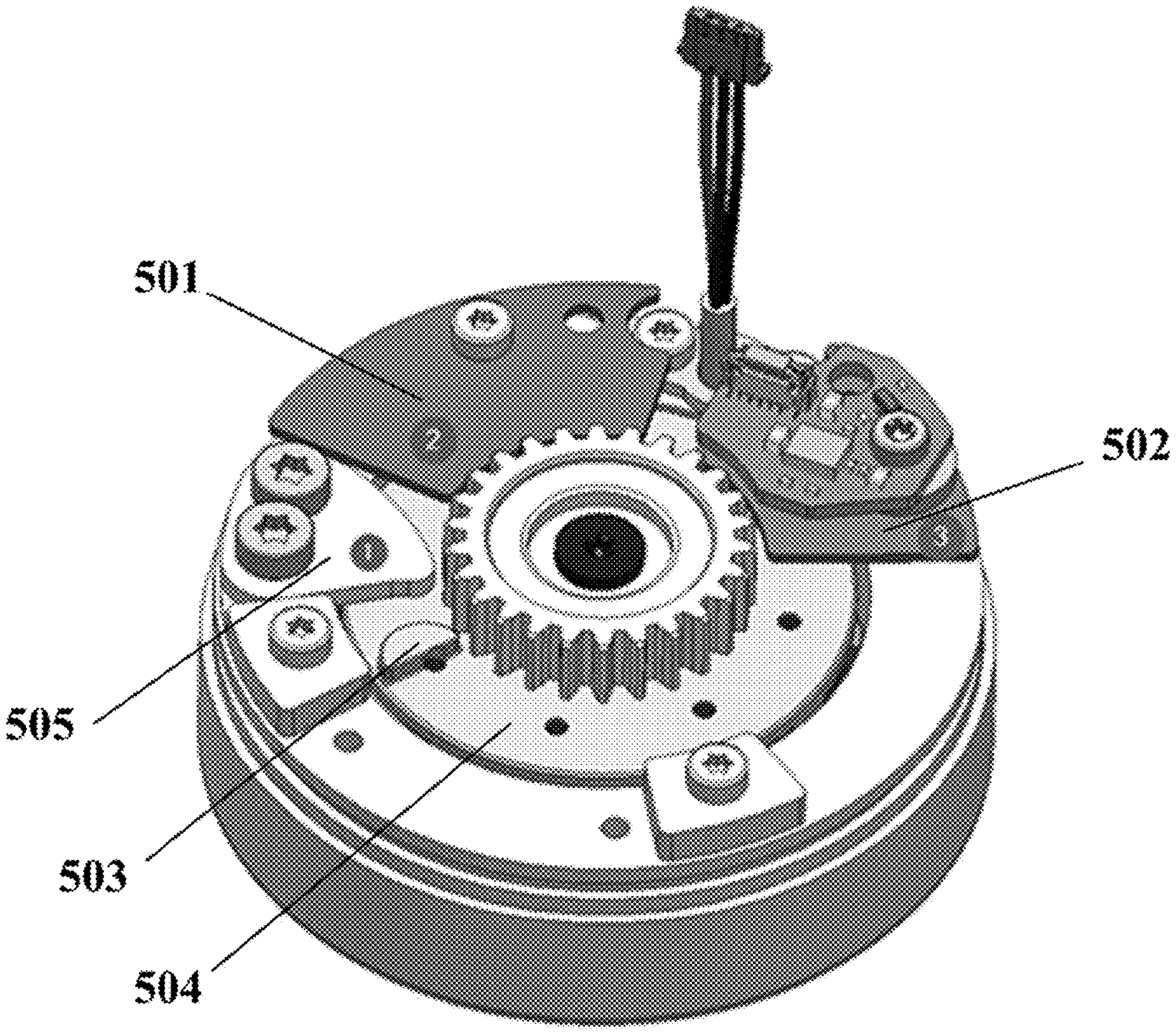
FIG. 5 illustrates a top perspective view of a magnetic gripper according to some embodiments described herein.
Figure 7:
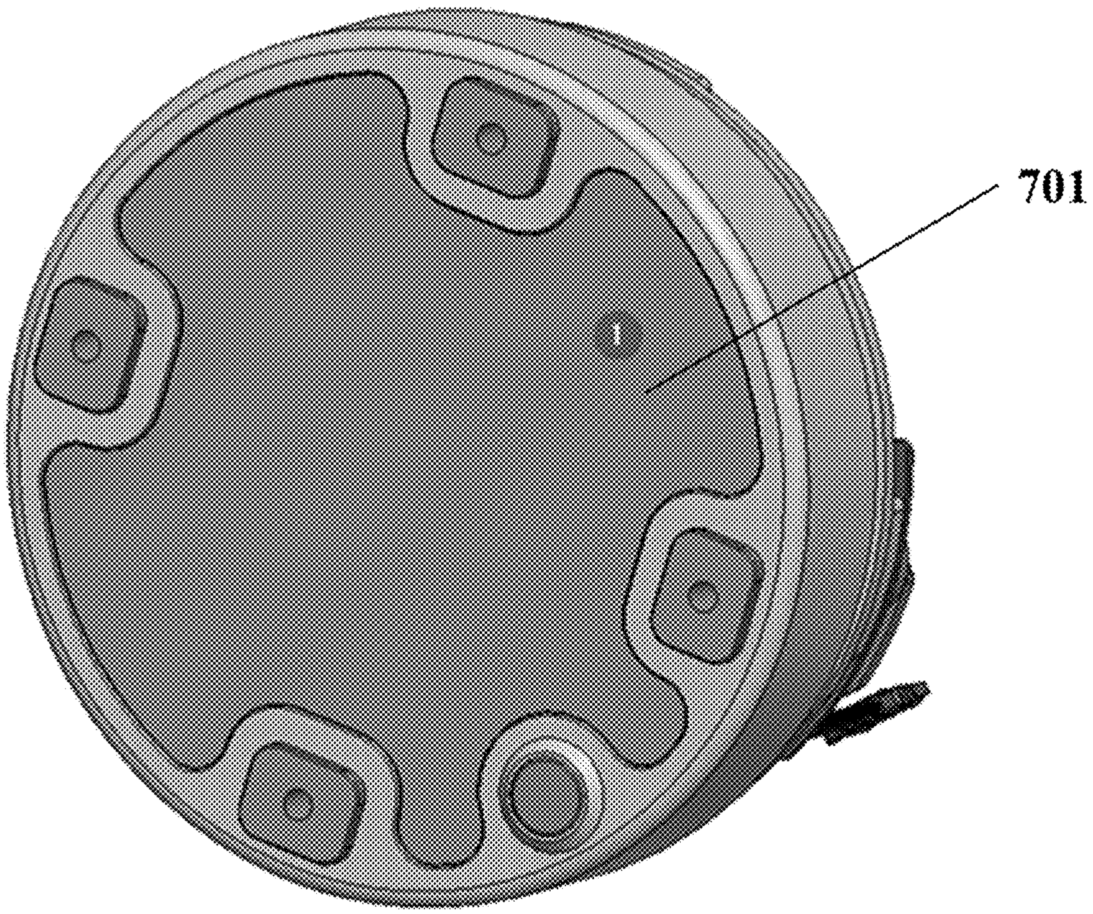
FIG. 7 illustrates a bottom perspective view of a magnetic gripper according to some embodiments described herein.

The magnetic gripper may comprise one or a plurality of magnetic shielding members that reduce leakage of magnetic flux not transferred to the object. FIG. 5 illustrates the top perspective view of one embodiment of the magnetic gripper. This embodiment comprises magnetic shielding members (501) and (502) which reduces leakage of magnetic flux. FIG. 7 illustrates a bottom perspective view of one embodiment of the magnetic gripper. This embodiment comprises a magnetic shielding member (701) that limits or reduces magnetic flux leakage or residue magnetism. Those skilled in the art will recognize that said magnetic shielding members may comprise numerous forms and may be comprised of different materials, that said magnetic shielding members may be placed at various locations in the magnetic gripper, and that said magnetic shielding members may be static or movable.

The magnetic gripper may comprise one or a plurality of magnetic flux guiding members that increases the maximum strength of the magnetic flux transferred to the object. FIG. 2 illustrates a bottom perspective view of a magnetic gripper according to some embodiments described herein. This embodiment comprises a magnetic flux guiding member that is coupled to a portion of one pole member. Magnetic flux guiding members can increase the maximum strength of magnetic flux transferred from the gripper to an object in a multitude of ways. First, it may provide better physical contact between the gripping surface and the object, wherein the object may have an irregular shape, and wherein the magnetic flux guiding members are shaped and placed appropriately on the gripper to maximize the physical contact between the pieces. Second, it may provide a magnetically conductive path, inside or outside the housing, which increases the maximum amount of magnetic flux transferred by the magnets to the pole members, thus increasing the maximum amount of magnetic flux that the pole members can transfer to the object. Those skilled in the art will recognize that said magnetic flux guiding members may comprise numerous forms and may be comprised of different materials, that said magnetic flux guiding members may be placed at various locations in the magnetic gripper, and that said magnetic flux guiding members may be static or movable.

The magnetic gripper may comprise one or a plurality of features that guide the movement of any movable part in the gripper. FIG. 5 illustrates the top perspective view of one embodiment of the magnetic gripper. This embodiment comprises a feature (503) on the rotor (504) which stops the gripper at 100% rotation via physical contact with a feature on the housing (505). Those skilled in the art will recognize that said features may comprise numerous forms and may be comprised of different materials, that said features may be placed at various locations in the magnetic gripper, and that said features may be static or movable.

Figure 6:
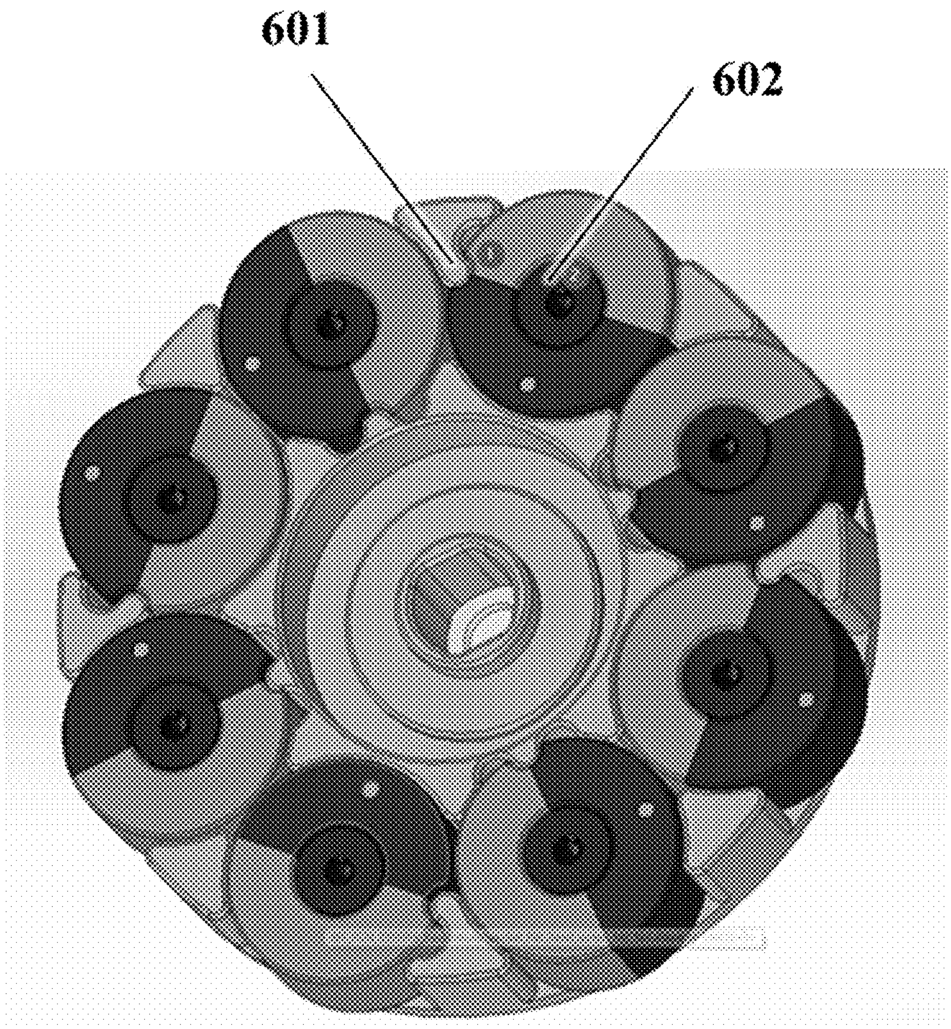
FIG. 6 illustrates a magnet array and housing according to some embodiments described herein.

The magnetic gripper may comprise one or a plurality of notch features on its components. FIG. 6 illustrates an inner view of one embodiment of the magnet array and a portion of the housing. This embodiment comprises a contour feature on the housing (602) and a notch feature on the magnet (601) which together determine the position and the orientation of each magnet in the magnet array when placed in the housing. These features can allow the magnets in the array to be housed without glue. For example, the housing may comprise one or more compartments that have complementary shapes to the magnets to house the magnets in such one or more compartments without a separate fastening mechanism between the magnet and the housing structure. Alternatively or in addition, the magnets may be coupled to the housing via one or more fastening mechanisms (e.g., screws). Those skilled in the art will recognize that said notch features may comprise numerous forms, that said notch features may be present on any of component of the magnetic gripper, and that said notch features may be placed at various locations in each component.

Computer Systems

Figure 4:
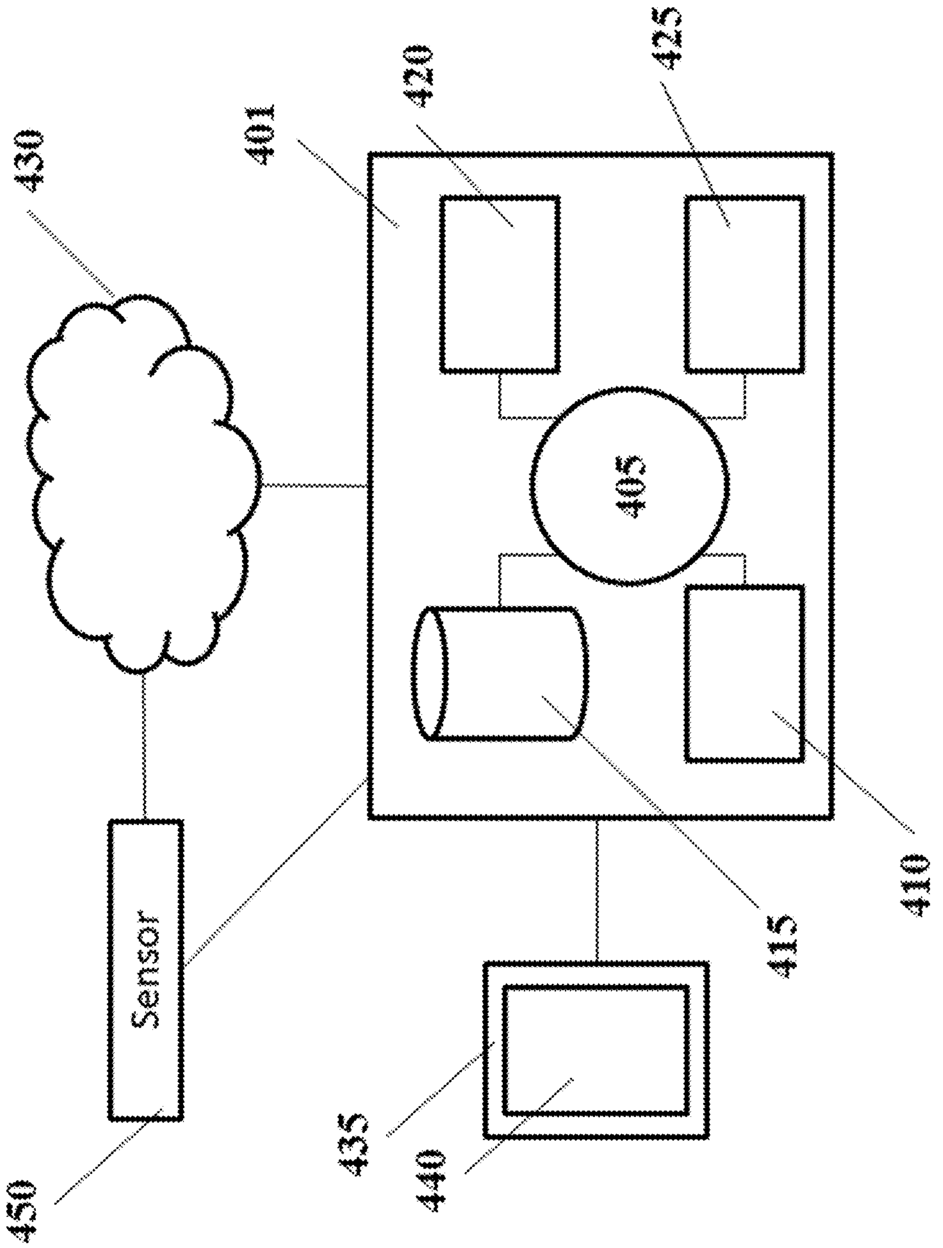
FIG. 4 shows a computer system that is programmed or otherwise configured to implement methods provided herein.

The present disclosure provides computer systems that are programmed to implement methods of the disclosure. FIG. 4 shows a computer system 401 that is programmed or otherwise configured to implement the magnetic gripping methods and systems of the present disclosure. The computer system 401 can regulate various aspects of the methods and systems of the present disclosure, such as, for example, tuning the magnetic gripper between different states, including switching the magnetic gripper on or off, based on one or more signals collected from a sensor 450 (e.g., sensor 105) in operative communication with the magnetic gripper. The computer system 401 can be an electronic device of a user or a computer system that is remotely located with respect to the electronic device. The electronic device can be electronically connected to a magnetic gripper. The electronic device can be integrated into a robotic system that may comprise a magnetic gripper.

The computer system 401, also referred to herein as controller or controller unit, includes a central processing unit (CPU, also "processor" and "computer processor" herein) 405, which can be a single core or multi core processor, or a plurality of processors for parallel processing. The computer system 401 also includes memory or memory z 410 (e.g., random-access memory, read-only memory, flash memory), electronic storage unit 415 (e.g., hard disk), communication interface 420 (e.g., network adapter) for communicating with one or more other systems, and peripheral devices 425, such as cache, other memory, data storage and/or electronic display adapters. The memory 410, storage unit 415, interface 420 and peripheral devices 425 are in communication with the CPU 405 through a communication bus (solid lines), such as a motherboard. The storage unit 415 can be a data storage unit (or data repository) for storing data. The computer system 401 can be operatively coupled to a computer network ("network") 430 with the aid of the communication interface 420. The network 430 can be the Internet, an internet and/or extranet, or an intranet and/or extranet that is in communication with the Internet. The network 430 in some cases is a telecommunication and/or data network. The network 430 can include one or more computer servers, which can enable distributed computing, such as cloud computing. The network 430, in some cases with the aid of the computer system 401, can implement a peer-to-peer network, which may enable devices coupled to the computer system 401 to behave as a client or a server. In some cases, one or more signals collected from the sensor 450 may be transmitted to the computer system through the network 430.

Using information from one or more signals collected from the sensor, the computer system may actuate a magnetic gripper at a distance from an object or may actuate a magnetic gripper when the gripper is in physical contact with the object. Those skilled in the art will recognize that said signals may be transmitted through any appropriate network, systems, computers, circuits, or any other effective means of communicating said signals.

The CPU 405 can execute a sequence of machine-readable instructions, which can be embodied in a program or software. The instructions may be stored in a memory location, such as the memory 410. The instructions can be directed to the CPU 405, which can subsequently program or otherwise configure the CPU 405 to implement methods of the present disclosure. Examples of operations performed by the CPU 405 can include fetch, decode, execute, and writeback.

The CPU 405 can be part of a circuit, such as an integrated circuit. One or more other components of the system 401 can be included in the circuit. In some cases, the circuit is an application specific integrated circuit (ASIC).

The storage unit 415 can store files, such as drivers, libraries, and saved programs. The storage unit 415 can store user data, e.g., user preferences and user programs. The computer system 401 in some cases can include one or more additional data storage units that are external to the computer system 401, such as located on a remote server that is in communication with the computer system 401 through an intranet or the Internet.

The computer system 401 can communicate with one or more remote computer systems through the network 430. For instance, the computer system 401 can communicate with a remote computer system of a user (e.g., an operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 401 via the network 430.

Methods as described herein can be implemented by way of machine (e.g., computer processor) executable code stored on an electronic storage location of the computer system 401, such as, for example, on the memory 410 or electronic storage unit 415. The machine executable or machine-readable code can be provided in the form of software. During use, the code can be executed by the processor 405. In some cases, the code can be retrieved from the storage unit 415 and stored on the memory 410 for ready access by the processor 405. In some situations, the electronic storage unit 415 can be precluded, and machine-executable instructions are stored on memory 410.

The code can be pre-compiled and configured for use with a machine having a processer adapted to execute the code or can be compiled during runtime. The code can be supplied in a programming language that can be selected to enable the code to execute in a pre-compiled or as-compiled fashion.

Aspects of the systems and methods provided herein, such as the computer system 401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 401 can include or be in communication with an electronic display 435 that comprises a user interface (UI) 440 for providing, for example, control options for an operator, for example, to shut down the system in an emergency, to increase or decrease the power of the gripper, or to hold a workpiece in a position for a period of time. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 405. The algorithm can, for example, stop the system from operating or moving due to a presence of an object detected by the proximity sensor. In another example, the algorithm can automatically move sheets of metal from a stack of a plurality of sheets of metal one by one to a predetermined place that is not the initial stack of the plurality of sheets.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A system for handling an object, comprising:

a first arrangement of magnets;

a second arrangement of magnets, wherein said second arrangement of magnets and said first arrangement magnets are movable relative to one another; and a plurality of pole members, wherein said plurality of pole members is (i) in a first magnetic interaction with said first arrangement of magnets and (ii) in a second magnetic interaction with said second arrangement of magnets, wherein each pole member of said plurality of pole members is configured to transfer magnetic flux caused by said first magnetic interaction and said second magnetic interaction to said object, wherein one or more of said first arrangement of magnets and said second arrangement of magnets are configured to vary in position relative to one another to vary said first magnetic interaction, said second magnetic interaction, or both, and to vary said magnetic flux transferred to said object;

wherein a housing structure for said first arrangement of magnets and said second arrangement of magnets comprises a plurality of magnetic flux guiding members, wherein said plurality of magnetic flux guiding members comprises a ferromagnetic doped polymer.

2. The system of claim 1, wherein in a first set of configurations of said first arrangement of magnets and said second arrangement of magnets, said magnetic flux is adapted to lift multiple objects, including said object, wherein in a second set of configurations of said first arrangement of magnets and said second arrangement of magnets, said magnetic flux is adapted to lift only a single object, wherein said single object is said object, and wherein in a third set of configurations of said first arrangement of magnets and said second arrangement of magnets, said magnetic flux is adapted to release said object.

3. The system of claim 1, wherein said housing structure further comprises a gripping surface, and wherein said plurality of pole members is at least partially disposed through said gripping surface.

4. The system of claim 3, wherein said gripping surface of said housing structure is substantially flush with gripping surfaces of plurality of pole members.

5. The system of claim 3, wherein said at least partially disposed plurality of pole members extend past said gripping surface.

6. The system of claim 3, wherein said housing structure further comprises compartments that are substantially complementary in shape to house each magnet in said first arrangement of magnets and said second arrangement of magnets.

7. The system of claim 1, further comprising sensors for detecting a distance between said plurality of pole members and said object.

8. The system of claim 7, further comprising a tunable actuation system that moves said first arrangement of magnets, said second arrangement of magnets, or both.

9. The system of claim 8, further comprising a controller operably coupled to said proximity sensors and said tunable actuation system.

10. The system of claim 1, wherein said system is integrated in a robotic system.

11. The system of claim 1, wherein said first arrangement of magnets and said second arrangement of magnets are each arranged in a Halbach array.

12. A method for handling an object, comprising:

(a) providing a housing structure comprising (1) a first arrangement of magnets, (2) a second arrangement of magnets, wherein said second arrangement of magnets and said first arrangement magnets are movable relative to one another, (3) a plurality of pole members, wherein said plurality of pole members is (i) in a first magnetic interaction with said first arrangement of magnets and (ii) in a second magnetic interaction with said second arrangement of magnets, wherein each pole member of said plurality of pole members is configured to transfer magnetic flux caused by said first magnetic interaction and said second magnetic interaction to said object, and (4) a plurality of magnetic flux guiding members, wherein said plurality of magnetic flux guiding members comprises a ferromagnetic doped polymer; and (b) moving one or more of said first arrangement of magnets and said second arrangement of magnets to vary their position relative to one another to vary said first magnetic interaction, said second magnetic interaction, or both, and to vary said magnetic flux transferred to said object.

13. The method of claim 12, comprising:

(A) adapting said magnetic flux to lift multiple objects, including said object, by moving said first arrangement of magnets and said second arrangement of magnets into one configuration in a first set of configurations; or (B) adapting said magnetic flux to lift only a single object, wherein said single object is said object, by moving said first arrangement of magnets and said second arrangement of magnets into one configuration in a second set of configurations; or (C) adapting said magnetic flux to release said object, by moving said first arrangement of magnets and said second arrangement of magnets into one configuration in a third set of configurations.

14. The method of claim 12, wherein said housing structure further comprises a gripping surface, and wherein said plurality of pole members is at least partially disposed through said gripping surface.

15. The method of claim 14, wherein said gripping surface of said housing structure is substantially flush with gripping surfaces of said plurality of pole members.

16. The method of claim 14, wherein said at least partially disposed plurality of pole members extend past said gripping surface.

17. The method of claim 14, wherein said housing structure further comprises compartments that are substantially complementary in shape to house each magnet in said first arrangement of magnets and said second arrangement of magnets.

18. The method of claim 12, further comprising providing sensors for detecting a distance between said plurality of pole members and said object.

19. The method of claim 18, further comprising providing a tunable actuation system that moves said first arrangement of magnets, said second arrangement of magnets, or both.

20. The method of claim 19, further comprising providing a controller operably coupled to said proximity sensors and said tunable actuation system.

21. The method of claim 12, wherein said method is performed by a robotic system.

22. The method of claim 12, wherein said first arrangement of magnets and said second arrangement of magnets are each arranged in a Halbach array.

* * * * *